A. SHIRRAN & W. J. GIVENS.
Hoof-Trimmer.
No. 159,972.                    Patented Feb. 16, 1875.
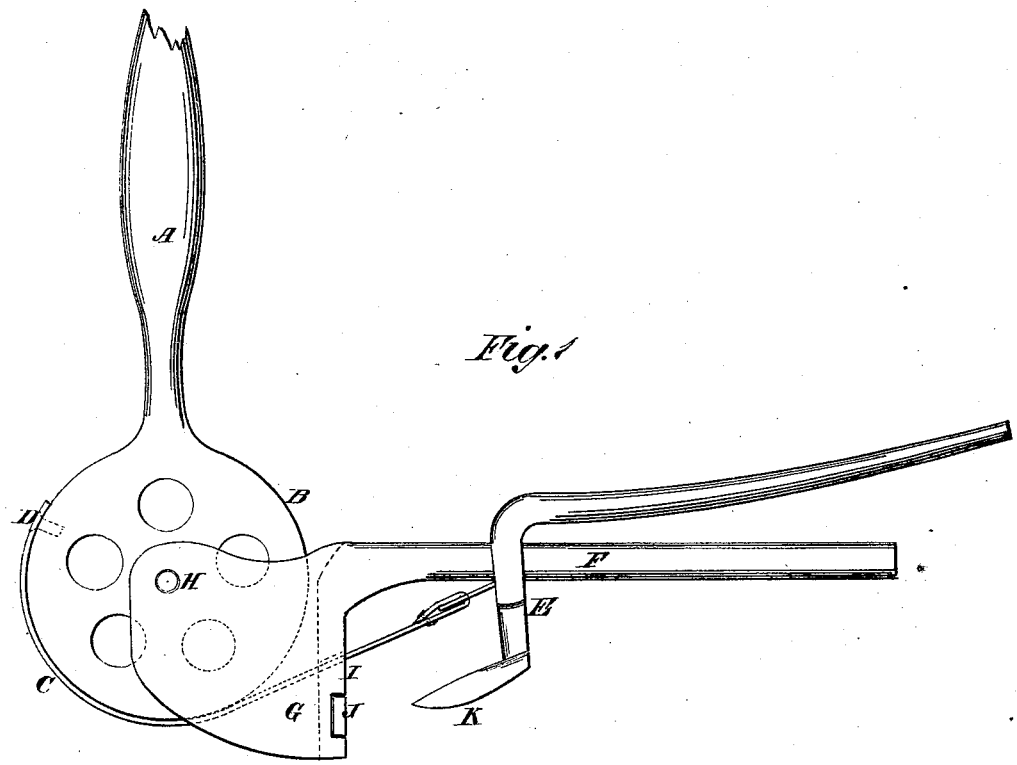
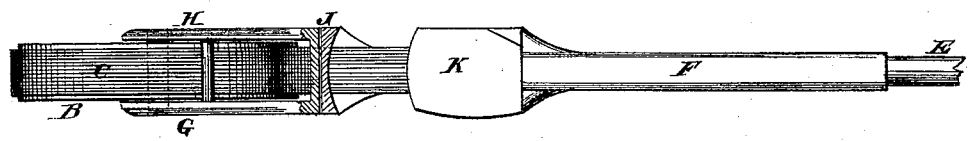
WITNESSES:                      INVENTOR:
                                Andrew Shirran
                                William J. Givens
                                BY
                                ATTORNEYS.
THE GRAPHIC CO.PHOTO-LITH.39 & 41 PARK PLACE,N.Y.

UNITED STATES PATENT OFFICE.

ANDREW SHIRRAN AND WILLIAM J. GIVENS, OF PACHECO, CALIFORNIA.

IMPROVEMENT IN HOOF-TRIMMERS.

Specification forming part of Letters Patent No. 159,972, dated February 16, 1875; application filed April 11, 1874.

*To all whom it may concern:*

Be it known that we, ANDREW SHIRRAN and WILLIAM J. GIVENS, of Pacheco, in the county of Contra Costa and State of California, have invented a new and useful Improvement in Hoof-Trimmer, of which the following is a specification:

This invention relates to the shoeing of horses; and consists in an implement for "paring" or "trimming" the hoofs, constructed and operated as hereinafter described.

In the accompanying drawing, Figure 1 represents a side view, showing the construction of the machine. Fig. 2 is an edge view of the same.

Similar letters of reference indicate corresponding parts.

A is the working lever, having at its end a round disk, B. C is a band-spring, attached at one end to the periphery of this disk, as seen at D. The other end is attached to the knife-handle E, which slides on the bar F. This bar F is attached to the slotted head G, in which the disk B works. The disk B works on the center-pin H.

In operating the knife the disk is given a revolving motion, thereby winding more or less of the band C on its surface in cutting, and in releasing the band in every backward movement of the knife.

In operating with the machine the shoulder I of the slotted head G is placed against the outside of the hoof. The bearing-surface of this shoulder is faced with a concave piece of brass, J, which receives the rim of the hoof. This arrangement throws the knife toward the center of the hoof, and by working the lever A back and forth the knife will be made to work from the center to the outer edge of the hoof.

The knife K is convex and attached to the lower end of the handle E. This portion E of the knife-handle is at about right angles to the knife, and also to the back portion of the handle. The part E is mortised, so that the knife-handle slides on the bar F as the knife works back and forth.

A cord or chain may be used instead of a band-spring; but I prefer the arrangement shown in the drawing, as being best adapted to the purpose.

It will be seen that a powerful purchase is obtained on the knife, and that it is not necessary to soften the hoof in order to properly trim it.

In the process of trimming with this implement the hoof is held in the same position that it is when the ordinary knife is used.

Having thus described our invention, we claim as new and desire to secure by Letters Patent—

A machine for trimming hoofs, constructed substantially as shown and described—that is, having a working lever, A, and disk B, (connected with the knife-handle by a flexible connection,) knife K, handle E, and bar F, arranged as and for the purpose described.

ANDREW SHIRRAN.
WILLIAM J. GIVENS.

Witnesses:
J. H. CAROTHERS,
G. R. OLIVER.